United States Patent [19]
Kobayashi et al.

[11] Patent Number: 5,824,736
[45] Date of Patent: Oct. 20, 1998

[54] FLUOROSILICONE RUBBER COMPOSITION

[75] Inventors: Hideki Kobayashi; Wataru Nishiumi, both of Chiba Prefecture, Japan

[73] Assignee: Dow Corning Toray Silicone Co., Ltd., Tokyo, Japan

[21] Appl. No.: 124,747

[22] Filed: Sep. 21, 1993

[30] Foreign Application Priority Data

Sep. 21, 1992 [JP] Japan .................................. 4-276666

[51] Int. Cl.$^6$ ........................................................ C08F 3/36
[52] U.S. Cl. ........................... 524/588; 515/477; 515/478
[58] Field of Search .................................. 525/477, 478; 524/588

[56] References Cited

U.S. PATENT DOCUMENTS

| 3,974,120 | 8/1976 | Kazzano et al. | 260/30.45 B |
|---|---|---|---|
| 4,355,121 | 10/1982 | Evans | 523/213 |
| 4,492,786 | 1/1985 | Evans et al. | 524/865 |
| 4,529,774 | 7/1985 | Evans et al. | 524/860 |
| 4,604,444 | 8/1986 | Donnadieu et al. | 528/34 |
| 4,960,811 | 10/1990 | Evans | 524/265 |
| 5,171,773 | 12/1992 | Chaffee et al. | 524/493 |

FOREIGN PATENT DOCUMENTS 50056 12/1980 Japan .

*Primary Examiner*—Margaret W. Glass
*Attorney, Agent, or Firm*—William F. Boley; Jeanne D. Dodd

[57] ABSTRACT

The present fluorosilicone rubber composition cures to give fluorosilicone rubber moldings with excellent physical properties. The fluorosilicone rubber composition comprises:

(A) a 3,3,3-trifluoropropylmethylsiloxane-methylvinylsiloxane copolymer gum,
(B) a dimethylsiloxane-methylvinylsiloxane copolymer gum,
(C) a poly(3,3,3-trifluoropropylmethylsiloxane)-polydimethylsiloxane block copolymer or (C-2) a poly(3,3,3-trifluoropropylmethylsiloxane)-polydimethylsiloxane-polymethylvinylsiloxane block copolymer,
(D) a reinforcing silica micropowder that has a surface area of at least 50 m$^2$/g, and
(E) a curing agent.

20 Claims, No Drawings

FLUOROSILICONE RUBBER COMPOSITION

BACKGROUND OF INVENTION

The present invention relates to a fluorosilicone rubber composition. More specifically, the present invention relates to a fluorosilicone rubber composition that cures to give fluorosilicone rubber moldings with excellent physical properties.

Because fluorosilicone rubber compositions cure to form moldings with excellent oil resistance, gasoline resistance, heat resistance, cold resistance, and so on, they are employed in applications where these properties are critical. Compositions known as fluorosilicone rubber compositions are (1) compositions based on a copolymer gum that consists of a large amount of the 3,3,3-trifluoropropylmethylsiloxane unit and a small amount of the methylvinylsiloxane unit and (2) compositions based on the mixture of a copolymer gum that consists of a large amount of the 3,3,3-trifluoropropylmethylsiloxane unit and a small amount of the methylvinylsiloxane unit with a copolymer gum that consists of a large amount of the dimethylsiloxane unit and a small amount of the methylvinylsiloxane unit. Among these, the latter compositions are in greater demand than the former because they are less costly to manufacture and have a better processability in such operations as roll processing, and so forth. However, due to the fundamental lack of compatibility between 3,3,3-trifluoropropylmethylsiloxane-methylvinylsiloxane copolymer gum and dimethylsiloxane-methylvinylsiloxane copolymer gum, phase separation often occurs between the two, resulting in a substantial lowering of physical properties such as mechanical strength and so forth.

The present invention came about as a result of research by the present inventors directed at solving this problem. The inventors have discovered that the addition of a special block copolymer to compositions based on 3,3,3-trifluoropropylmethylsiloxane-methylvinylsiloxane copolymer gum plus dimethylsiloxane-methylvinylsiloxane copolymer gum results in a substantial improvement in the compatibility of these two types of gums and in excellent physical properties for the cured products.

SUMMARY OF INVENTION

The present invention takes as its object the introduction of a fluorosilicone rubber composition that gives fluorosilicone rubber moldings in which the gum components are highly compatible and which have excellent post-cure physical properties. The fluorosilicone rubber composition comprises a 3,3,3-trifluoropropylmethylsiloxane-methylvinylsiloxane copolymer gum, a dimethylsiloxane-methylvinylsiloxane copolymer gum, a poly(3,3,3-trifluoropropylmethylsiloxane)-polydimethylsiloxane block copolymer or a poly(3,3,3-trifluoropropylmethylsiloxane)-polydimethylsiloxane-polymethylvinylsiloxane block copolymer, a reinforcing silica Micropowder that has a surface area of at least 50 m$^2$/G, and a curing agent.

DETAILED DESCRIPTION OF THE INVENTION

The present invention relates to a fluorosilicone rubber composition comprising:
(A) 100 weight parts of a 3,3,3-trifluoropropylmethylsiloxane-methylvinylsiloxane copolymer gum having a concentration of methylvinylsiloxane unit in a range of about 0.001 to 5 mole percent,
(B) 30 to 200 weight parts of a dimethylsiloxane-methylvinylsiloxane copolymer gum having a concentration of methylvinylsiloxane unit in a range of about 0.001 to 5 mole percent,
(C-1) 0.5 to 20 weight parts of a poly(3,3,3-trifluoropropylmethylsiloxane)-polydimethylsiloxane block copolymer,
(D) a reinforcing silica micropowder having a surface area of at least 50 m$^2$/g, in an amount of 10 to 100 weight parts for each 100 weight parts of the total of components (A), (B), and (C-1), and
(E) a curing agent in a quantity sufficient to cure the composition.

The present invention also relates to a fluorosilicone rubber composition comprising:
(A) 100 weight parts of a 3,3,3-trifluoropropylmethylsiloxane-methylvinylsiloxane copolymer gum having a concentration of methylvinylsiloxane unit in a range of about 0.001 to 5 mole percent,
(B) 30 to 200 weight parts of a dimethylsiloxane-methylvinylsiloxane copolymer gum having a concentration of methylvinylsiloxane unit in a range of about 0.001 to 5 mole percent,
(C-2) 0.5 to 20 weight parts of a poly(3,3,3-trifluoropropylmethylsiloxane)-polydimethylsiloxane-polymethylvinylsiloxane block copolymer,
(D) a reinforcing silica micropowder having a surface area of at least 50 m$^2$/g, in an amount of 10 to 100 weight parts for each 100 weight parts of the total of components (A), (B), and (C-2), and
(E) a curing agent in a quantity sufficient to cure the composition.

Poly(3,3,3-trifluoropropylmethylsiloxane)-polydimethylsiloxane block copolymer and poly(3,3,3-trifluoropropylmethylsiloxane)-polydimethylsiloxane-polymethylvinylsiloxane block copolymer are referred to as Components (C-1) and (C-2), respectively, throughout this disclosure, however, each is shown separately as a component (C) in the independent claims.

The 3,3,3-trifluoropropylmethylsiloxane-methylvinylsiloxane copolymer gum comprising the component (A) used in the composition of the present invention is a main or principal constituent of the composition of the present invention and should have a degree of polymerization that provides a gum-like material, Such gums are known in the art and ordinarily have degrees of polymerization in the range of 1,000 to 20,000. The vinyl group content of this copolymer should be 0.001 to 5 mole % as methylvinylsiloxane unit referred to the 3,3,3-trifluoropropylmethylsiloxane unit. Examples of the molecular chain end groups of the 3,3,3-trifluoropropylmethylsiloxane-methylvinylsiloxane copolymer gum include trimethylsiloxy, dimethylvinylsiloxy, hydroxydimethylsiloxy, hydroxy(3,3,3-trifluoropropyl)methylsiloxy, and similar groups.

The dimethylsiloxane-methylvinylsiloxane copolymer gum comprising the component (E) used in the composition of the present invention is, like component (A), a principal constituent of the composition of the present invention and should have a degree of polymerization that provides a gum-like material. Such gums are known in the art and ordinarily have degrees of polymerization in the range of 1,000 to 20,000. The vinyl group content is to be a value that gives 0.001 to 5 mole % methylvinylsiloxane unit referred to the dimethylsiloxane unit. Examples of the molecular chain end groups of the dimethylsiloxane-methylvinylsiloxane copolymer gum include trimethylsiloxy, dimethylvinylsiloxy, hydroxydimethylsiloxy, hydroxy(3,3,3-trifluoropropyl) methylsiloxy, and similar groups. Component (B) should be added in the range of 30 to 200 weight parts per 100 weight parts component (A).

The poly(3,3,3-trifluoropropylmethylsiloxane) polydimethylsiloxane block copolymer comprising the component (C-1) in the composition of the present invention is a component that characterizes the composition of the present invention. This component (C-1) functions as a compatibilizer to improve the compatibility between components (A) and (B).

The degree of polymerization of this poly(3,3,3-trifluoropropylmethylsiloxane)-polydimethylsiloxane block copolymer should generally fall in the range of 100 to 30,000 and preferably falls in the range of 1,000 to 20,000. This poly(3,3,3-trifluoropropylmethylsiloxane)-polydimethylsiloxane block copolymer preferably contains 20 to 80 mole % 3,3,3-trifluoropropylmethylsiloxane unit. Examples of the molecular chain end groups of the poly(3,3,3-trifluoropropylmethylsiloxane)-polydimethylsiloxane block copolymer include trimethylsiloxy, dimethylvinylsiloxy, hydroxydimethylsiloxy, hydroxy(3,3,3-trifluoropropyl)methylsiloxy, and similar groups.

This poly(3,3,3-trifluoropropylmethylsiloxane)-polydimethylsiloxane block copolymer can be obtained by living polymerization in the presence of alkyllithium or lithium silanolate catalyst using the cyclic trisiloxane described by formula (a) below and the cyclic trisiloxane described by formula (b) below as starting materials.

Formula (a):

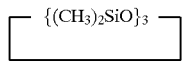

Formula (b):

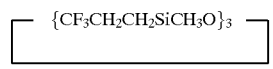

In a specific example of the preparation of this block copolymer, living polymerization is carried out on cyclic trisiloxane with formula (a) in the presence of alkyllithium or lithium silanolate catalyst, cyclic trisiloxane with formula (b) is then added, and polymerization is continued. The polymerization apparatus should be preliminarily rendered anhydrous using, for example, dry nitrogen. The alkyllithium catalyst may be the type generally marketed as the ether or hexane solution, and it should be used in a quantity that provides 1 lithium atom per 300 to 50,000 siloxane silicon atoms. Polymerization is carried out with stirring at a temperature ranging from room temperature to 100° C. until the cyclic trisiloxane is consumed, and the polymerization time is generally 30 minutes to 1 day. The copolymer obtained under these polymerization conditions was confirmed to be an AB or ABA block copolymer.

When an organic solvent is employed, it is preferable to use toluene, hexane, heptane, tetrahydrofuran, and similar solvents. Suitable cyclic trisiloxane concentrations are 10 to 80 weight %. Furthermore, the use is preferred of dimethylformamide, dimethyl sulfoxide, or dimethylacetamide as a polymerization accelerator, which is ordinarily added at 0.1 to 20 weight % of the quantity of cyclic trisiloxane.

Component (C-1) should be added in the range of 0.5 to 20 weight parts per 100 weight parts component (A). No further benefit occurs at additions in excess of 20 weight parts.

Like component (C-1), the poly(3,3,3-trifluoropropylmethylsiloxane)-polydimethylsiloxane-polymethylvinylsiloxane block copolymer comprising the component (C-2) in the composition of the present invention is a component that characterizes the composition of the present invention. Component (C-2) also functions as a compatibilizer to improve the compatibility between components (A) and (B).

The degree of polymerization of this poly(3,3,3-trifluoropropylmethylsiloxane)-polydimethylsiloxane-polymethylvinylsiloxane block copolymer generally falls in the range of 100 to 30,000 and preferably falls in the range of 1,000 to 20,000. This poly(3,3,3-trifluoropropylmethylsiloxane) polydimethylsiloxane-polymethylvinylsiloxane block copolymer preferably contains 20 to 80 mole % 3,3,3-trifluoropropylmethylsiloxane unit. The methylvinylsiloxane unit preferably comprises 0.001 to 5 mole % of the total siloxane units. Examples of the molecular chain end groups of the poly(3,3,3-trifluoropropylmethylsiloxane)-polydimethylsiloxane-polymethylvinylsiloxane block copolymer include trimethylsiloxy, dimethylvinylsiloxy, hydroxydimethylsiloxy, hydroxy(3,3,3-trifluoropropyl) methylsiloxy, and similar groups.

This poly(3,3,3-trifluoropropylmethylsiloxane)-polydimethylsiloxane-polymethylvinylsiloxane block copolymer can be synthesized by living polymerization in the presence of alkyllithium or lithium silanolate catalyst using cyclic trisiloxane described by formula (a), cyclic trisiloxane described by formula (b). and cyclic trisiloxane described by formula (c) below as starting materials.

Formula (c):

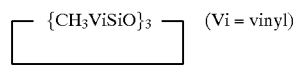

In a specific example of the preparation of this block copolymer, living polymerization is first carried out on cyclic trisiloxane described by formula (a) in the presence of alkyllithium or lithium silanolate catalyst, a mixture of cyclic trisiloxane described by formula (b) and cyclic trisiloxane described by formula (c) is then added, and polymerization is continued. Alternatively, this 3,3,3-trifluoropropylmethylsiloxane-polydimethylsiloxane-polymethylvinylsiloxane block copolymer may be prepared by first polymerizing a mixture of cyclic trisiloxane described by formula (a) and cyclic trisiloxane described by formula (c) in the presence of alkyllithium or lithium silanolate catalyst and then adding a mixture of cyclic trisiloxane described by formula (b) and cyclic trisiloxane described by formula (c) and continuing the polymerization. The polymerization apparatus should be preliminarily rendered anhydrous using, for example, dry nitrogen. The alkyllithium catalyst may be the type generally marketed as the ether or hexane solution, and it should be used in a quantity that provides 1 lithium atom per 300 to 50,000 siloxane silicon atoms. Polymerization is carried out with stirring at a temperature ranging from room temperature to 100° C. until the cyclic trisiloxane is consumed, and the polymerization time is generally 30 minutes to 1 day.

When an organic solvent is employed, it is preferable to use toluene, hexane, heptane, tetrahydrofuran, and similar solvents. Suitable cyclic trisiloxane concentrations are 10 to 80 weight %. Furthermore, the use is preferred of dimethylformamide, dimethyl sulfoxide, or dimethylacetamide as a polymerization accelerator, which is ordinarily added at 0.1 to 20 weight % of the quantity of cyclic trisiloxane.

Component (C-2) should be added in the range of 0.5 to 20 weight parts per 100 weight parts component (A). No further benefit occurs at additions in excess of 20 weight parts.

The reinforcing silica micropowder having a surface area of at least 50 m$^2$/g constituting the component (D) used in the composition of the present invention comprises those silica micropowders known in the art as silicone rubber fillers. This silica micropowder preferably has a surface area of 100 to 400 m$^2$/g and is exemplified by the fumed and calcined silicas obtained by dry processes and the precipitated silicas obtained by wet processes, as well as by the hydrophobic silicas prepared by treating the surfaces of the aforesaid silicas with dimethyldichlorosilane or hexamethyldisilazane. Component (D) should be added at 10 to 100 weight parts and preferably at 20 to 50 weight parts, in each case per 100 weight parts of the sum of components (A), (B), and (C).

The curing agent constituting the component (E) used in the composition of the present invention functions to cure the composition of the present invention and comprises those curing agents known in the art as curing agents for silicone rubber compositions. This curing agent may, for example, be an organoperoxide. Examples of said organoperoxides include benzoyl peroxide, 2,4-dichlorobenzoyl peroxide, di-tert-butyl peroxide, tert-butylmonochlorobenzoyl peroxide, 2,5-dimethyl- 2,5-di-(tert-butylperoxy)hexane, and similar compounds. Another example of this curing agent is the combination of a platinum catalyst and organohydrogenpolysiloxane having at least 2 silicon-bonded hydrogen atoms per molecule. Examples of the organohydrogenpolysiloxane include trimethylsiloxy-terminated dimethylsiloxane-methylhydrogensiloxane copolymers, trimethylsiloxy-terminated methylhydrogenpolysiloxanes, cyclic methylhydrogensiloxanes, and similar compounds, while examples of the platinum catalysts include chloroplatinic acid, complexes of chloroplatinic acid and olefin compounds, and complexes of chloroplatinic acid with divinyltetramethyldisiloxane.

The composition of the present invention is readily obtained simply by mixing to homogeneity components (A) through (E) which are described hereinbefore. In addition to these components, the composition of the present invention may contain those additives already known in the art for use in silicone rubber compositions.

Silanol-terminated diorganopolysiloxanes with a low degree of polymerization (DP) are examples of one type of such additives. These diorganopolysiloxanes, known as additives or wetters, which enhance the affinity between reinforcing silica micropowder (component (D)) and diorganopolysiloxane gums (components (A) and (B)), generally have hydroxyl groups at both terminals. Examples of the organic groups of these diorganopolysiloxanes include alkyl groups, e.g. methyl, ethyl, and propyl; aryl groups, e.g. phenyl; alkenyl groups, e.g. vinyl and allyl; and 3,3,3-trifluoropropyl. Wetters preferred for the present invention comprise low-DP silanol-terminated dimethylpolysiloxane, low-DP silanol-terminated 3,3,3-trifluoropropylmethylpolysiloxane, and low-DP silanol-terminated dimethylsiloxane-3,3,3-trifluoropropylmethylsiloxane copolymer. The degree of polymerization of these silanol-terminated diorganopolysiloxanes is preferably 1 to 100 and more preferably 2 to 30.

Other additives may be included in the composition of the present invention insofar as the object of the present invention is not impaired. Examples of these additives include extenders, e.g. powdered quartz, diatomaceous earth, calcium carbonate, and aluminosilicates; heat stabilizers and flame retardants, e.g. iron oxide, cerium oxide, aluminum oxide, zinc oxide, and manganese carbonate; titanium oxide, carbon black, and so forth.

Because the fluorosilicone rubber composition of the present invention consists of components (A) through (E), and in particular because it contains the poly(3,3,3-trifluoropropylmethylsiloxane)-polydimethylsiloxane block copolymer comprising component (C-1) or the poly(3,3,3-trifluoropropylmethylsiloxane)-polydimethylsiloxane-polymethylvinylsiloxane block copolymer comprising component (C-2), said composition gives fluorosilicone rubber moldings in which components (A) and (B) are highly compatible and which have excellent post-cure physical properties.

The present invention is explained in detail through the examples and reference examples that follow. In the examples, reference examples, and comparison examples, part denotes weight part, Vi represents the vinyl group, the viscosity is the value at 25° C., and cSt stands for centistokes.

REFERENCE EXAMPLE 1

Into a flask, after flushing the system with dry nitrogen to produce an anhydrous state, were introduced 0.27 g dimethylpolysiloxanediol containing 15 weight % hydroxyl group and 20 g preliminarily dried toluene. Lithium silanolate was synthesized by the addition of 1.5 mL (2.4 millimole) hexane solution of n-butyllithium (concentration=1.6 mole/L) using the syringe technique. To this lithium silanolate were added 3 g N,N-dimethylformamide and a preliminarily dried mixture of 300 g cyclic trisiloxane described by formula (d) below and 300 g toluene. After stirring at room temperature for 12 hours, analysis of the reaction mixture by gas/liquid chromatography (GLC) confirmed the disappearance of the cyclic trisiloxane described by formula (d). A mixture of 635.8 g cyclic trisiloxane described by formula (e) below and 300 g toluene was then added to the dimethylpolysiloxane, and high-speed stirring was carried out at room temperature. The reaction mixture became cloudy after 2 minutes, then after 10 minutes became transparent again and exhibited an increase in viscosity, and after 15 minutes had become a gum. The reaction was stopped by introducing dry ice. A gum was obtained by stripping for 6 hours under reduced pressure at a temperature of 150° C. When this gum was analyzed by $^{29}$Si-NMR analysis, the peak for the (CH$_3$)$_2$SiO unit was observed at −22.0 ppm and the peak for the CF$_3$CH$_2$CH$_2$SiCH$_3$O unit was observed at −22.1 ppm, and their integration ratio was 1:1. Clear glass transition points were observed at −123° C. and −70° C. in differential thermal analysis. These analytic results confirmed that the reaction product was a silanol-terminated poly(3,3,3-trifluoropropylmethylsiloxane)-polydimethylsiloxane block copolymer.

Formula (d):

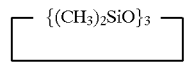

Formula (e):

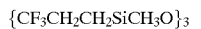

EXAMPLE 1

Into a kneader mixer were introduced 3 parts of the poly(3,3,3-trifluoropropylmethylsiloxane)-polydimethylsiloxane block copolymer synthesized in Reference Example 1, 50 parts dimethylvinylsiloxy-terminated 3,3,3-trifluoropropylmethylsiloxane-methylvinylsiloxane copolymer gum (average DP=7,000) consisting of 99 mole % ($CF_3CH_2CH_2SiCH_3O$) unit and 1 mole % $CH_3ViSiO$ unit, and 47 parts dimethylvinylsiloxy-terminated dimethylsiloxane-methylvinylsiloxane copolymer gum (average DP=7,000) consisting of 99.5 mole % $(CH_3)_2SiO$ unit and 0.5 mole % $CH_3ViSiO$ unit. A fluorosilicone rubber base was obtained by the addition of 25 parts surface-hydrophobicized fumed silica, having a surface area of 110 $m^2/g$, with mixing to homogeneity followed by the elimination of volatile components by heating for 1 hour at 100° C.

A fluorosilicone rubber composition was obtained by the addition of 0.5 part 2,5-dimethyl-2,5-di (tert-butylperoxy) hexane to 100 parts of the aforesaid rubber base with mixing to homogeneity on a two-roll mill. The obtained composition was compression molded at 170° C./30 kg/cm² for 10 minutes to obtain a sheet with a thickness of 2 mm. This sheet was additionally heated in an oven for 4 hours at 200° C. The physical properties of this sheet were measured in accordance with JIS K-6301, and the sheet's fracture surface was visually inspected after the measurements. These results are reported in Table 1 below.

REFERENCE EXAMPLE 2

Into a flask, after flushing the system with dry nitrogen to produce an anhydrous state, were introduced 0.27 g dimethylpolysiloxanediol containing 15 weight % hydroxyl group and 20 g preliminarily dried toluene. Lithium silanolate was synthesized by the addition of 1.5 mL (2.4 millimole) hexane solution of n-butyllithium (concentration=1.6 mole/L) using the syringe technique. To this lithium silanolate were added 3 g N,N-dimethylformamide and a preliminarily dried mixture of 300 g cyclic trisiloxane described by formula (d) as used in Reference Example 1, 1 g cyclic trisiloxane described by formula (f) below, and 300 g toluene, and the reaction was then stirred for 12 hours at room temperature. Analysis of the reaction mixture by gas/liquid chromatography (GLC) confirmed the disappearance of the cyclic trisiloxane described by formula (d) from Reference Example 1. Analysis by gel permeation chromatography (GPC) confirmed a dimethylpolysiloxane with weight-average molecular weight=189,000, number-average molecular weight=118,000, and dispersity index=1.6. No oligomer by-product was observed.

To this dimethylpolysiloxane was then added a mixture of 635.8 g cyclic trisiloxane described by formula (e) as used in Reference Example 1, 1 g cyclic trisiloxane described by formula (f) below, and 300 g toluene, and high-speed stirring was carried out at room temperature. The reaction mixture became cloudy after 2 minutes, after 10 minutes again became transparent and exhibited a viscosity increase, and after 15 minutes had converted to a gum. The reaction was stopped by introducing dry ice. A gum was recovered by stripping for 6 hours under reduced pressure at a temperature of 150° C. When this gum material was analyzed by $^{29}Si$-NMR analysis, the peak for the $(CH_3)_2SiO$ unit was observed at −21.0 ppm and the peak for the $CF_3CH_2CH_2SiCH_3O$ unit was observed at −22.1 ppm, and their integration ratio was 1:1. Clear glass transition points were observed at −123° C. and −70° C. according to differential thermal analysis These analytic results confirmed that the reaction product was a silanol-terminated poly(3,3,3-trifluoropropylmethylsiloxane)-polydimethylsiloxane-polymethylvinylsiloxane block copolymer.

Formula (f):

EXAMPLE 2

Into a kneader mixer were introduced 3 parts poly(3,3,3-trifluoropropylmethylsiloxane)-polydimethylsiloxane-polymethylvinylsiloxane block copolymer as synthesized in Reference Example 2, 50 parts dimethylvinylsiloxy-terminated 3,3,3-trifluoropropylmethylsiloxane-methylvinylsiloxane copolymer gum (average DP=7,000) consisting of 99 mole % ($CF_3CH_2CH_2SiCH_3O$) unit and 1 mole % $CH_3ViSiO$ unit, and 47 parts dimethylvinylsiloxy-terminated dimethylsiloxane-methylvinylsiloxane copolymer gum (average DP=7,000) consisting of 99.5 mole % $(CH_3)_2SiO$ unit and 0.5 mole % $CH_3ViSiO$ unit. A fluorosilicone rubber base was obtained by the addition of 25 parts surface-hydrophobicized fumed silica, having a surface area of 110 $m^2/g$, with mixing to homogeneity followed by the elimination of volatile components by heating for 1 hour at 100° C.

A fluorosilicone rubber composition was obtained by the addition of 0.5 part 2,5-dimethyl-2,5-di(tert-butylperoxy) hexane to 100 parts of the aforesaid rubber base with mixing to homogeneity on a two-roll mill. The obtained composition was compression molded at 170° C./30 kg/cm² for 10 minutes to obtain a sheet with a thickness of 2 mm. This sheet was additionally heated in an oven for 4 hours at 200° C. The physical properties of this sheet were measured in accordance with JIS K-6301, and the sheet's fracture surface was visually inspected after the measurements. These results are reported in Table 1 below.

EXAMPLE 3

A fluorosilicone rubber composition was prepared as in Example 2, but in this case using 5 parts of the poly(3,3,3-trifluoropropylmethylsiloxane)-polydimethylsiloxane-polymethylvinylsiloxane block copolymer used in Example 2, 50 parts of the 3,3,3-trifluoropropylmethylsiloxane-methylvinylsiloxane copolymer gum, and 45 parts of the dimethylsiloxane-methylvinylsiloxane copolymer gum. The physical properties of this composition were measured as in Example 2, and the sheet's fracture surface was visually inspected after the measurements. These results are reported in Table 1 below.

COMPARISON EXAMPLE 1

A fluorosilicone rubber base was prepared as in Example 2, but in this case without using the 3 parts poly(3,3,3-trifluoropropylmethylsiloxane)-polydimethylsiloxanepolymethylvinylsiloxane block copolymer that was used in Example 2 and using 50 parts of the dimethylsiloxane-methylvinylsiloxane copolymer gum. Then, using 100 parts of this rubber base, a fluorosilicone rubber composition was prepared as in Example 2. The physical properties of this composition were measured as in Example 2, and the sheet's fracture surface was visually inspected after the measurements. These results are reported in Table 1 below.

TABLE 1

|  | Example 1 | Eample 2 | Example 3 | Comp. Ex. 1 |
| --- | --- | --- | --- | --- |
| durometer hardness (JIS A) | 23 | 26 | 27 | 25 |
| tensile strength (kg/cm$^2$) | 60 | 78 | 70 | 30 |
| elongation (%) | 430 | 390 | 410 | 260 |
| fracture surface | uniform, smooth | uniform, smooth | uniform, smooth | phase separation occurred |

REFERENCE EXAMPLE 3

Into a flask, after flushing the system with dry nitrogen to produce an anhydrous state, was introduced the preliminarily dried mixture of 300 g cyclic trisiloxane described by formula (d) as used in Reference Example 1 and 300 g toluene. Dimethyl sulfoxide in an amount of 1 g was then added, and 1.5 mL (2.4 millimole) hexane solution of n-butyllithium (concentration=1.6 mole/L) was added using the syringe technique. After stirring for 9 hours at room temperature, it was confirmed by GLC that the cyclic trisiloxane had disappeared. GPC determination confirmed a dimethylpolysiloxane with weight-average molecular weight of 120,000 and a dispersity index of 1.2. Oligomer by-product was not observed.

A mixture of 635 g cyclic trisiloxane described by formula (e) as used in Reference Example 1, 1 g cyclic trisiloxane described by formula (f) as used in Reference Example 2, and 300 g toluene was added, and high-speed stirring was carried out at room temperature. After 15 minutes, the reaction mixture had converted to a gum, and the reaction was stopped by introducing dry ice. A silanol-terminated poly(3,3,3-trifluoropropylmethylsiloxane)-polydimethylsiloxane-polymethylvinylsiloxane block copolymer gum was obtained by stripping for 6 hours under reduced pressure at a temperature of 150° C.

EXAMPLE 4

Into a kneader mixer were introduced 2 parts silanol-terminated poly(3,3,3-trifluoropropylmethylsiloxane)-polydimethylsiloxane-polymethylvinylsiloxane block copolymer as obtained In Reference Example 3, 50 parts 3,3,3-trifluoropropylmethylsiloxane-methylvinylsiloxane copolymer gum as used in Example 2, and 48 parts dimethylsiloxane-methylvinylsiloxane copolymer gum as used in Example 2. Hydroxyl-terminated dimethylsiloxane (average DP=5) in an amount of 8 parts was also introduced into the kneader mixer. This was then followed by the introduction of 35 parts fumed silica, having a surface area of 300 m$^2$/g, and a fluorosilicone rubber base was prepared by first mixing to homogeneity and then eliminating the volatile components by heating for 1 hour at 150° C.

A fluorosilicone rubber composition was prepared by the addition of 0.5 part 2,5-dimethyl-2,5-di(tert-butylperoxy) hexane to 100 parts of the aforesaid rubber base and mixing to homogeneity on a two-roll mill. The obtained composition was compression molded at 170° C./30 kg/cm$^2$ for 10 minutes to obtain a sheet with a thickness of 2 mm. The physical properties of this sheet were measured in accordance with JIS K-6301, and the sheet's fracture surface was visually inspected after the measurements. These results are reported in Table 2 below.

EXAMPLE 5

A fluorosilicone rubber composition was prepared as in Example 4, but in this case using 5 parts of the silanol-terminated poly(3,3,3-trifluoropropylmethylsiloxane)-polydimethylsiloxane-polymethylvinylsiloxane block copolymer used in Example 4, 50 parts of the 3,3,3-trifluoropropylmethylsiloxane-methylvinylsiloxane copolymer gum, and 45 parts of the dimethylsiloxane-methylvinylsiloxane copolymer gum. The physical properties of this composition were measured as in Example 4, and the sheet's fracture surface was visually inspected after the measurements. These results are reported in Table 2 below.

COMPARISON EXAMPLE 2

A fluorosilicone rubber composition was prepared as in Example 4, but in this case without using the 2 parts silanol-terminated poly(3,3,3-trifluoropropylmethylsiloxane)-polydimethylsiloxane-polymethylvinylsiloxane block copolymer used in Example 4 and using 50 parts of the dimethylsiloxane-methylvinylsiloxane copolymer gum. The physical properties of this composition were measured as in Example 4, and the sheet's fracture surface was visually inspected after the measurements. These results are reported in Table 2 below.

TABLE 2

|  | Example 4 | Example 5 | Comparison Example 2 |
| --- | --- | --- | --- |
| durometer hardness (JIS A) | 36 | 38 | 37 |
| tensile strength (kg/cm$^2$) | 89 | 90 | 40 |
| elongation (%) | 380 | 430 | 250 |
| fracture surface | smooth, uniform | smooth, uniform | phase separation occurred |

EXAMPLE 6

A fluorosilicone rubber composition was prepared by the addition of 1 part trimethylsiloxy-terminated methylhydrogenpolysiloxane with a viscosity of 20 cSt. sufficient chloroplatinic acid/divinyltetramethyldisiloxane complex to give a platinum concentration of 25 ppm, and 0.05 part phenylbutynol as reaction inhibitor to 100 parts fluorosilicone rubber base prepared as in Example 2. This composition was compression molded for 10 minutes at 150° C./30 kg/cm$^2$ to obtain a sheet with a thickness of 2 mm. The physical properties of this sheet were measured in accordance with JIS K-6301, and the sheet's fracture surface was visually inspected after the measurements. These results are reported in Table 3 below.

COMPARISON EXAMPLE 3

A fluorosilicone rubber composition was prepared as in Example 6, with the exception that 100 parts fluorosilicone rubber base in accordance with Comparison Example 1 was used instead of the fluorosilicone rubber base in accordance with Example 2 that was used in Example 6. The physical properties of this composition were measured as in Example 6, and the sheet's fracture surface was visually inspected after the measurements. These results are reported in Table 3 below.

TABLE 3

|  | Example 6 | Comparison Example 3 |
| --- | --- | --- |
| duromoter hardness (JIS A) | 46 | 47 |
| tensile strength (kg/cm$^2$) | 75 | 36 |
| elongation (%) | 350 | 240 |
| fracture surface | smooth, uniform | phase separation occurred |

We claim:
1. A fluorosilicone rubber composition, comprising:
   (A) 100 weight parts of a 3,3,3-trifluoropropylmethylsiloxane-methylvinylsiloxane copolymer gum having a concentration of methylvinylsiloxane unit in a range of about 0.001 to 5 mole percent,
   (B) 30 to 200 weight parts of a dimethylsiloxane-methylvinylsiloxane copolymer gum having a concentration of methylvinylsiloxane unit in a range of about 0.001 to 5 mole percent,
   (C) 0.5 to 20 weight parts of a poly(3,3,3-trifluoropropylmethylsiloxane)-polydimethylsiloxane block copolymer,
   (D) a reinforcing silica micropowder having a surface area of at least 50 m$^2$/g, in an amount of 10 to 100 weight parts per 100 weight parts of the total of components (A), (B), and (C), and
   (E) a curing agent in a quantity sufficient to cure the composition.

2. A composition according to claim 1, wherein the poly(3,3,3-trifluoropropylmethylsiloxane)-polydimethylsiloxane block copolymer has a degree of polymerization in a range of about 1,000 to 20,000.

3. A composition according to claim 1, wherein the poly(3,3,3-trifluoropropylmethylsiloxane)-polydimethylsiloxane block copolymer has a concentration of trifluoropropylmethylsiloxane unit in a range of about 20 to 80 mole percent.

4. A composition according to claim 1, wherein the reinforcing silica micropowder has a surface area in a range of about 100 to 400 m$^2$/g.

5. A composition according to claim 1, wherein the reinforcing silica micropowder is in an amount in a range of 20 to 50 parts.

6. A composition-according to claim 1, wherein the poly (3,3,3-trifluoropropylmethylsiloxane)-polydimethylsiloxane block copolymer has a degree of polymerization in a range of about 1,000 to 20,000 and a concentration of trifluoropropylmethylsiloxane unit in a range of 20 to 80 mole percent, and the reinforcing silica micropowder is in an amount of 20 to 50 weight parts and has a surface area in the range of about 100 to 400 m$^2$/g.

7. A composition according to claim 1, wherein the curing agent is an organoperoxide selected from a group consisting of benzoyl peroxide, 2,4-dichlorobenzoyl peroxide, di-tert-butyl peroxide, tert-butylmonochlorobenzoyl peroxide, and 2,5-dimethyl-2,5-di(tert-butylperoxy)hexane.

8. A composition according to claim 1, wherein the curing agent is a combination of a platinum catalyst and an organohydrogenpolysiloxane having at least 2 silicon-bonded hydrogen atoms per molecule.

9. A composition according to claim 1, further comprising a silanol-terminated diorganopolysiloxane, having a degree of polymerization in a range of about 1 to 100, selected from a group consisting of silanol-terminated dimethylpolysiloxane, silanol-terminated 3,3,3-trifluoropropylmethylpolysiloxane, and silanol-terminated dimethylsiloxane-3,3,3-trifluoropropylmethylsiloxane copolymer.

10. A composition according to claim 6, further comprising a silanol-terminated diorganopolysiloxane, having a degree of polymerization in a range of about 2–30, selected from a group consisting of silanol-terminated dimethylpolysiloxane, silanol-terminated 3,3,3-trifluoropropylmethylpolysiloxane, and silanol-terminated dimethylsiloxane-3,3,3-trifluoropropylmethylsiloxane copolymer.

11. A fluorosilicone rubber composition, comprising:
   (A) 100 weight parts of a 3,3,3-trifluoropropylmethylsiloxane-methylvinylsiloxane copolymer gum having a concentration of methylvinylsiloxane unit in a range of about 0.001 to 5 mole percent,
   (B) 30 to 200 weight parts of a dimethylsiloxane-methylvinylsiloxane copolymer gum having a concentration of methylvinylsiloxane unit in a range of about 0.001 to 5 mole percent,
   (C) 0.5 to 20 weight parts of a poly(3,3,3-trifluoropropylmethylsiloxane)-polydimethylsiloxane-polymethylvinylsiloxane block copolymer,
   (D) a reinforcing silica micropowder having a surface area of at least 50 m$^2$/g, in an amount of 10 to 100 weight parts per 100 weight parts of the total of components (A), (B), and (C), and
   (E) a curing agent in a quantity sufficient to cure the composition.

12. A composition according to claim 11, wherein the poly(3,3,3-trifluoropropylmethylsiloxane)-polydimethylsiloxane-polymethylvinylsiloxane block copolymer has a degree of polymerization in a range of about 1,000 to 20,000.

13. A composition according to claim 11, wherein the poly(3,3,3-trifluoropropylmethylsiloxane)-polydimethylsiloxane-polymethylvinylsiloxane block copolymer has a concentration of 3,3,3- trifluoropropylmethylsiloxane unit in a range of about 20 to 80 mole percent.

14. A composition according to claim 11, wherein the reinforcing silica micropowder has a surface area in a range of about 100 to 400 m$^2$/g.

15. A composition according to claim 11, wherein the reinforcing silica micropowder is in an amount in a range of 20 to 50 parts.

16. A composition according to claim 11, wherein the poly(3,3,3-trifluoropropylmethylsiloxane)-polydimethylsiloxane-polymethylvinylsiloxane block copolymer has a degree of polymerization in a range of about 1,000 to 20,000 and a concentration of trifluoropropylmethylsiloxane unit in a range of 20 to 80 mole percent, and the reinforcing silica micropowder is in an amount of 20 to 50 weight parts and has a surface area in the range of about 100 to 400 m$^2$/g.

17. A composition according to claim 11, wherein the curing agent is an organoperoxide selected from a group consisting of benzoyl peroxide, 2,4-dichlorobenzoyl peroxide, di-tert-butyl peroxide, tert-butylmonochlorobenzoyl peroxide, and 2,5-dimethyl-2,5-di(tert-butylperoxy)hexane.

18. A composition according to claim 11, wherein the curing agent is a combination of a platinum catalyst and an organohydrogenpolysiloxane having at least 2 silicon-bonded hydrogen atoms per molecule.

19. A composition according to claim 11, further comprising a silanol-terminated diorganopolysiloxane, having a degree of polymerization in a range of about 1 to 100, selected from a group consisting of silanol-terminated dimethylpolysiloxane, silanol-terminated 3,3,3-trifluoropropylmethylpolysiloxane, and silanol-terminated dimethylsiloxane-3,3,3-trifluoropropylmethylsiloxane copolymer.

20. A composition according to claim 16, further comprising a silanol-terminated diorganopolysiloxane, having a degree of polymerization in a range of about 2–30, selected from a group consisting of silanol-terminated dimethylpolysiloxane, silanol-terminated 3,3,3-trifluoropropylmethylpolysiloxane, and silanol-terminated dimethylsiloxane-3,3,3-trifluoropropylmethylsiloxane copolymer.

* * * * *